US012477314B2

United States Patent
Al-Ghanim et al.

(10) Patent No.: US 12,477,314 B2
(45) Date of Patent: Nov. 18, 2025

(54) CONTROLLER FOR COORDINATING EMERGENCY ALERT BROADCASTS AT INDUSTRIAL FACILITIES

(71) Applicant: Saudi Arabian Oil Company, Dhahran (SA)

(72) Inventors: Rami A. Al-Ghanim, Tanajib (SA); Seetah A. Al-Otaibi, Dhahran (SA); Abdullah A. Al-Buainain, Tanajib (SA); Abdullah Y. Al-Hassan, Tanajib (SA)

(73) Assignee: Saudi Arabian Oil Company, Dhahran (SA)

( * ) Notice: Subject to any disclaimer, the term of this patent is extended or adjusted under 35 U.S.C. 154(b) by 329 days.

(21) Appl. No.: 18/340,377

(22) Filed: Jun. 23, 2023

(65) Prior Publication Data

US 2024/0430653 A1 Dec. 26, 2024

(51) Int. Cl.
*H04W 4/00* (2018.01)
*G08B 25/14* (2006.01)
(Continued)

(52) U.S. Cl.
CPC .............. *H04W 4/90* (2018.02); *G08B 25/14* (2013.01); *H04W 4/14* (2013.01)

(58) Field of Classification Search
CPC ........... H04W 4/90; H04W 4/14; G08B 25/14
See application file for complete search history.

(56) References Cited

U.S. PATENT DOCUMENTS 7,629,880 B2 * 12/2009 Stilp ...................... G08B 1/08
340/539.18
2007/0194922 A1 8/2007 Nathan et al.
(Continued)

FOREIGN PATENT DOCUMENTS

| JP | 2016151799 | 8/2016 |
| JP | 6517035 | 5/2019 |
| KR | 102362295 | 2/2022 |

OTHER PUBLICATIONS alertus.com [online], Alertus Console Activation/Emergency Operation Center, 2024, retrieved on Apr. 24, 2024, retrieved from URL<https://www.alertus.com/system>, 7 pages.

*Primary Examiner* — Omoniyi Obayanju
(74) *Attorney, Agent, or Firm* — Fish & Richardson P.C.

(57) ABSTRACT

Systems and methods for automatically broadcasting a real-time emergency signal to multiple networked devices at an industrial facility include detecting activation of an emergency alert siren, and identifying networked devices specified to receive a secondary alert signal, the networked devices configured for communication using one or more communication networks associated with the industrial facility. For each networked device, a type of broadcast message is identified and generated, in real-time. Generating a broadcast message includes broadcasting, to a radio device, an audible emergency alert message via a radio system; broadcasting a text-based emergency alert message to a cellular device, using short message service (SMS) messages using a cellular network; pushing a pop-up emergency alert message to a local computing device over a local network; and generating an automated telephone call with a pre-recorded voice message for transmitting using a telephone network.

20 Claims, 4 Drawing Sheets

(51) Int. Cl.
*H04W 4/14* (2009.01)
*H04W 4/90* (2018.01)

(56) References Cited

U.S. PATENT DOCUMENTS

| | | |
|---|---|---|
| 2008/0055077 A1 | 3/2008 | Lane et al. |
| 2014/0003586 A1 | 1/2014 | Agrawal et al. |
| 2016/0217679 A1* | 7/2016 | McNutt ................. G08B 25/12 |

* cited by examiner

CONTROLLER FOR COORDINATING EMERGENCY ALERT BROADCASTS AT INDUSTRIAL FACILITIES

TECHNICAL FIELD

The present disclosure relates to broadcasting emergency alerts at industrial facilities.

BACKGROUND

Emergency situations at industrial facilities can create dangerous environments for personnel working at or visiting the facility. For example, a chemical leak or spill at a chemical processing plant can be harmful to people in the area of the leak or spill. Conventionally, personnel are alerted to an emergency situation by a loud horn, alarm, or emergency alert siren.

SUMMARY

This disclosure describes methods and systems for automatically broadcasting a real-time emergency alert signal to multiple networked devices at an industrial facility. A data processing system (e.g., a siren controller, an interactive control console, a computing device) detects activation of an emergency alert siren. The data processing system identifies network devices specified to receive a secondary alert signal. The data processing system generates a broadcast message for each networked device according to the identified type of the networked device. The data processing system broadcasts audible radio messages in response to identifying radio devices. The data processing system broadcasts text-based short message service (SMS) messages in response to detecting cellular devices. The data processing system pushes pop-up messages to local computing devices connected to the local network of the facility. The data processing system generates automated telephone calls with a pre-recorded voice messages in response to identifying telephone devices.

Implementations of the systems and methods of this disclosure can provide various technical benefits. Alerting personnel in the industrial facility using only an emergency alert siren can have limited reach to personnel due, for example, to objects (e.g., buildings or walls) obstructing the sound waves from the siren, conflicting sounds generated by plant heavy equipment, or the distance of personnel from the siren. People with hearing loss and/or deafness may not receive the alert. Additionally, an emergency alert siren relies on a person (e.g., incident manager) to notify emergency responders of the incident. Lack of notification to personnel and timely evacuation from a facility can endanger lives of personnel.

To overcome these challenges, the systems and methods of this disclosure automatically generate and broadcast emergency alerts to multiple devices. A controller can interface with multiple disparate network types to broadcast the emergency alert to various different kinds of devices using different communication protocols and data types. This coordination among disparate communication networks decreases the time between detection of an emergency and notification to emergency responders, compared with a system requiring a dispatcher to notify emergency responders and coordinate across disparate communication networks. Specifically, the data processing system broadcasts alerts in multiple formats and to multiple target devices to alert personnel that may not be able to hear the emergency alert siren. In some implementations, the target devices may be communicating over different networks and can be incompatible with one another for communicating. The data processing system can receive real-time locations of emergency response vehicles and display the locations on a map of the facility increasing situational awareness. The data processing system can centralize communication with emergency responders. The data processing system also provides visibility to incident managers of the emergency incident by controlling a closed circuit camera system and displaying live video from the closed circuit camera system.

In one aspect, a method for automatically broadcasting a real-time emergency signal to multiple networked devices at an industrial facility includes detecting, at a location within the industrial facility, activation of an emergency alert siren; in response to detecting activation of the emergency alert siren, identifying a multiple networked devices specified to receive a secondary alert signal, the networked devices configured for communication using one or more communication networks associated with the industrial facility; identifying, for each networked device, a type of broadcast message that is compatible for real-time communication with that networked device; generating, in real-time for each networked device, a broadcast message having the identified type, wherein generating the broadcast message includes in response to identifying a radio device, broadcasting, to the radio device, an audible emergency alert message via a radio system; in response to identifying a cellular device, broadcasting a text-based emergency alert message, to the cellular device, using short message service (SMS) messages using a cellular network; in response to identifying a local computing device, pushing a pop-up emergency alert message to the local computing device over a local network; and in response to identifying a telephone device, generating an automated telephone call with a pre-recorded voice message for transmitting using a telephone network.

In one aspect, a system for alerting personnel at an industrial facility in an emergency situation includes a facility siren controller including a plurality of interface ports; a radio base station communicatively coupled to the siren controller via a first port of the plurality of interface ports; a short message service (SMS) server coupled to the siren controller via a second port of the plurality of interface ports; a telephone system communicatively coupled to the siren controller via a third port of the plurality of interface ports; a local network server coupled to the siren controller via a fourth port of the plurality of interface ports: the facility siren controller comprising at least one processor and a memory storing instructions that, when executed by the at least one processor, cause the at least one processor to perform operations including detecting, at a location within the industrial facility, activation of an emergency alert siren; in response to detecting activation of the emergency alert siren, identifying a plurality of networked devices specified to receive a secondary alert signal, the plurality of networked devices configured for communication using one or more communication networks associated with the industrial facility; identifying, for each networked device of the plurality, a type of broadcast message that is compatible for real-time communication with that networked device; generating, in real-time for each networked device of the plurality, a broadcast message having the identified type, wherein generating the broadcast message includes: in response to identifying a radio device, broadcasting, to the radio device, an audible emergency alert message via a radio system; in response to identifying a cellular device, broadcasting a text-based emergency alert message, to the cellular device, using short message service (SMS) messages using a cellular network; in response to identifying a local computing device, pushing a pop-up emergency alert message to the local computing device over a local network; and in response to identifying a telephone device, generating an automated telephone call with a pre-recorded voice message for transmitting using a telephone network.

In one aspect, one or more non-transitory machine-readable storage devices storing instructions for automatically broadcasting a real-time emergency signal to a plurality of networked devices at an industrial facility, the instructions being executable by one or more processors, to cause performance of operations including: detecting, at a location within the industrial facility, activation of an emergency alert siren; in response to detecting activation of the emergency alert siren, identifying a plurality of networked devices specified to receive a secondary alert signal, the plurality of networked devices configured for communication using one or more communication networks associated with the industrial facility; identifying, for each networked device of the plurality, a type of broadcast message that is compatible for real-time communication with that networked device; generating, in real-time for each networked device of the plurality, a broadcast message having the identified type, wherein generating the broadcast message includes: in response to identifying a radio device, broadcasting, to the radio device, an audible emergency alert message via a radio system; in response to identifying a cellular device, broadcasting a text-based emergency alert message, to the cellular device, using short message service (SMS) messages using a cellular network; in response to identifying a local computing device, pushing a pop-up emergency alert message to the local computing device over a local network; and in response to identifying a telephone device, generating an automated telephone call with a pre-recorded voice message for transmitting using a telephone network.

Implementations of these aspects can include one or more of the following features.

In some implementations, pushing the pop-up emergency alert message includes activating a server system to generate an instruction configured to cause an application instance hosted on the computing device to interrupt execution of one or more executing programs and render a graphical representation of an emergency message in the broadcast message; and causing the server system to transmit the broadcast message including the instruction over the local network to the computing device.

In some cases, the pop-up emergency alert message includes a visual alert and an audible alert.

In some implementations, identifying a telephone device includes accessing, from a data store, a registry of telephone numbers associated with the industrial facility.

In some implementations, broadcasting, to the radio device, an audible emergency alert message via a radio system includes broadcasting a pre-recorded voice message via a two-way radio system.

In some implementations, broadcasting a text-based emergency alert, message, to the cellular device, using SMS messages using a cellular network includes a date, a time, and the location of the detected emergency alert siren.

In some implementations, these aspects include receiving one or more real-time locations of emergency response vehicles; and displaying, on a display device, a map of the facility showing the one or more real-time locations of emergency response vehicles.

In some implementations, these aspects include in response to detecting an emergency alert siren, controlling closed circuit cameras to view the location of the activated emergency alert siren; and displaying, on the display device, live video from the closed circuit cameras.

In some implementations, these aspects include an interactive control console communicatively coupled to the siren controller, the interactive control console comprising a display device, at least one processor, and a memory storing instructions that, when executed by the at least one processor, cause the at least one processor to perform a second set of operations including: receiving one or more real-time locations of emergency response vehicles; and displaying, on a display device, a map of the facility showing the one or more real-time locations of emergency response vehicles.

In some implementations, the second set of operations further include in response to detecting an emergency alert siren, controlling closed circuit cameras to view the location of the activated emergency alert siren; and displaying, on the display device, live video from the closed circuit cameras.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

Like reference symbols in the various drawings indicate like elements.

DETAILED DESCRIPTION

This specification describes methods and systems for responding to emergency alert sirens at an industrial facility (e.g., a chemical plant, a factory, a refinery, etc.). A data processing system, such as a siren controller or a computing device, detects activation of an emergency alert siren. The data processing system identifies multiple networked devices that have been specified to receive secondary alert signals via one or more communication networks associated with the industrial facility. Examples of networked devices include radios, cellular devices, local computing devices, and telephones.

The data processing system identifies a type of broadcast message compatible for real-time communication for each networked device. Real-time or near real-time processing and/or communication refers to a scenario in which received data (e.g., emergency alert messages) are processed as made available to systems and devices requesting those data immediately (e.g., within milliseconds, tens of milliseconds, or hundreds of milliseconds) after the processing of those data are completed, without introducing data persistence or store-then-forward actions. In this context, a real-time communication system is configured to process an emergency alert message as it arrives and broadcast the emergency alert message as quickly as possible (though processing latency may occur). Though data can be buffered between module interfaces in a pipelined architecture, each individual module operates on the most recent data available to it. The overall result is a workflow that, in a real-time context, receives a data stream (e.g., an emergency alert message) and outputs (e.g., broadcasts) processed data based on that data stream in a first-in, first out manner. However, non-real-time contexts are also possible, in which data are stored (either in memory or persistently) for processing at a later time. In this context, modules of the data processing system do not necessarily operate on the most recent data available.

The data processing system generates in real-time a broadcast message for each networked device having the identified type. The data processing system broadcasts an audible emergency alert message to radio devices via a radio system. The data processing system broadcasts text-based short message service (SMS) messages using a cellular network. The data processing system pushes pop-up messages to local computing devices (e.g., desktop computer, laptop computer, tablets) over a local network. The data processing system generates automated telephone calls with pre-recorded voice messages for transmitting over cellular or wired telephone networks.

Figure 1:
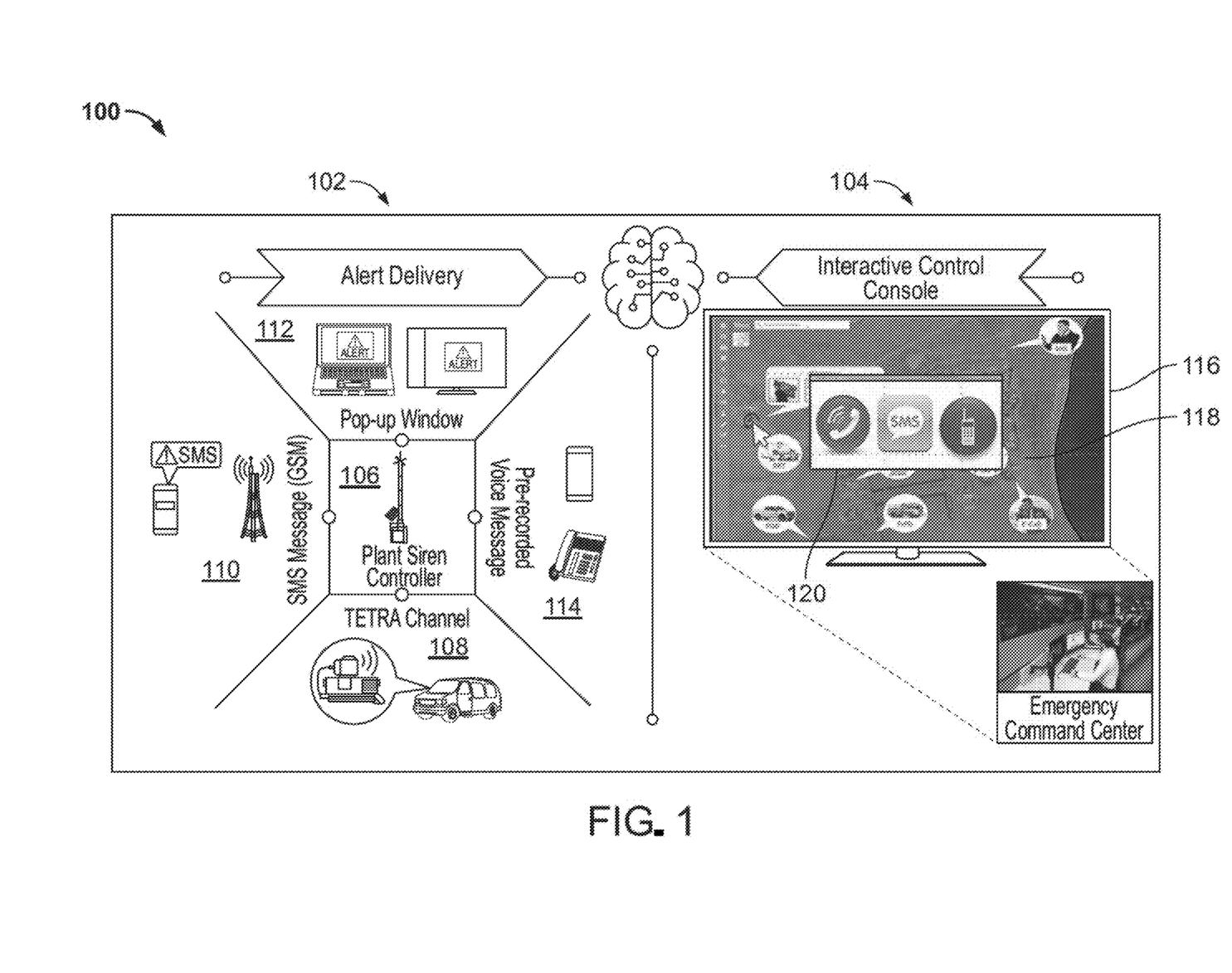
FIG. 1 illustrates an example emergency response system to automatically alert personnel of an emergency incident.

FIG. 1 illustrates an example emergency response system 40. The emergency response system 100 includes two sub-systems, an alert delivery system 102 and an interactive control console 104. The alert delivery system 102 includes a siren controller 106 communicatively coupled to a radio system 108, a cellular network 110, a local IT network 112, and a telephone system 114.

The interactive control console 104 includes a display device 116. The interactive control console 104 can be located, for example, in an emergency response center of the industrial facility. The interactive control console 104 can receive real-time locations of emergency response vehicles and display the real-time locations on an interactive map 118. The interactive control console 104 can also provide a user interface 120 to communicate with emergency responders via the networked devices connected to the alert delivery system 102.

Figure 2:
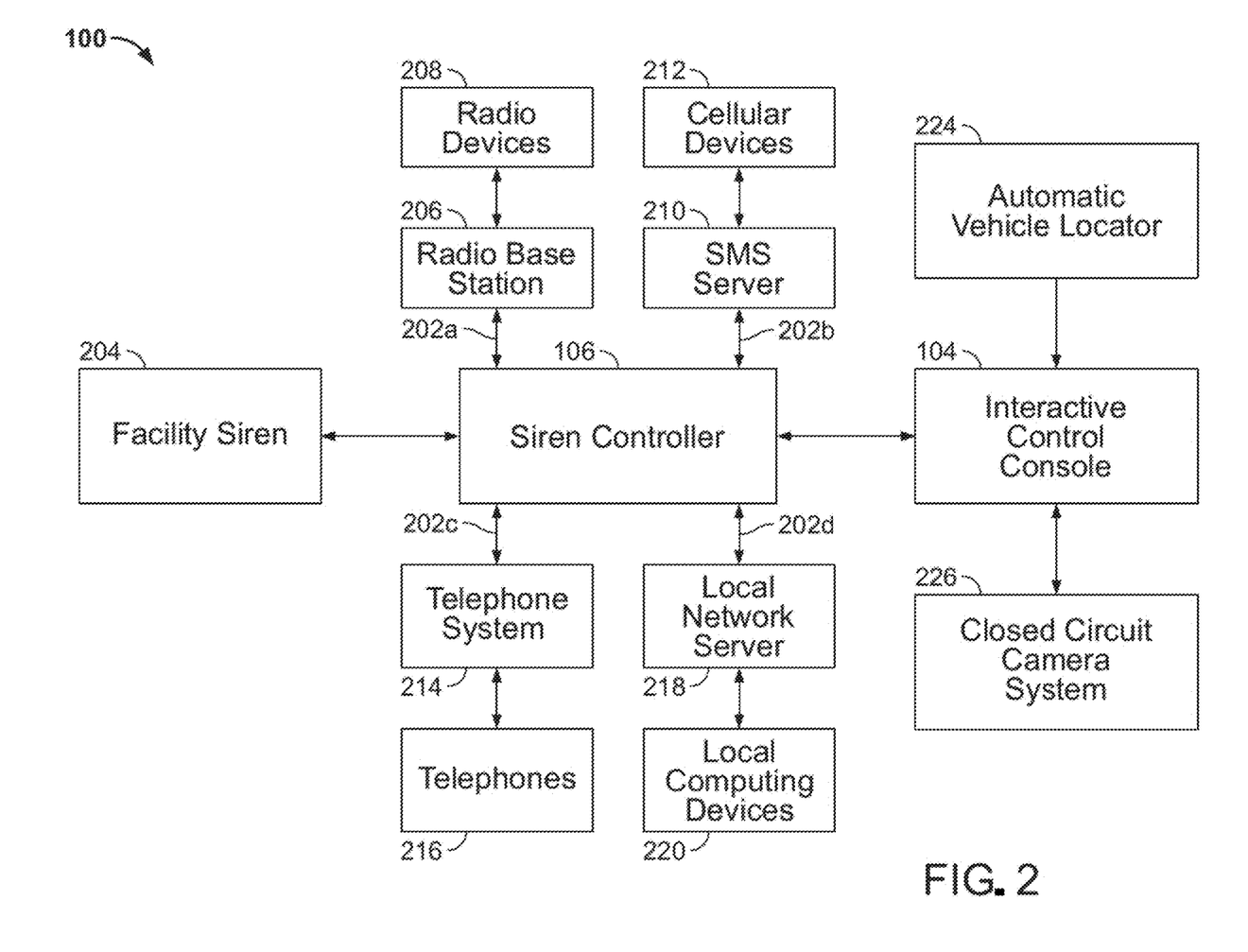
FIG. 2 is a block diagram illustrating the example emergency response system.

FIG. 2 is a block diagram of the example emergency response system 100. The siren controller 106 includes multiple interface ports 202a-d (collectively interface ports 202) configured to connect to multiple devices and networks. The siren controller 106 can be located in a designated location within the industrial facility (e.g., in an emergency command center). The siren controller 106 is communicatively coupled to at least one facility siren 204.

The facility siren 204 can include one or more sensors to activate siren when an emergency incident occurs. For example, the facility siren 204 can include a gas sensor to detect a hazardous gas leak at a refinery or a smoke or heat detector to determine that a fire has started. Additionally, or alternatively, the facility siren 204 is configured to be manually activated by, for example, an emergency switch.

A radio base station 206 is connected to the siren controller 106 via a first interface port 202a of the siren controller 106. The radio base station 206 can receive a signal from the siren controller 106 to broadcast an emergency alert message to radio devices 208 in the industrial facility. The emergency alert message can include a pre-recorded voice message. In some implementations, the emergency alert message includes the location of the emergency incident. The radio base station 206 can be a two-way radio base station or a trunked radio system base station (e.g., TETRA radio). For example, the radio base station can be configured to communicate directly with emergency response personnel. In some implementations, the radio base station 206 can be a frequency modulated (FM) radio base station configured to broadcast messages over an FM radio channel.

An SMS server 210 is connected to the siren controller 106 through a second interface port 202b of the siren controller 106. The SMS server 210 is configured to broadcast text-based SMS messages to cellular devices 212 (e.g., cellular phones, smartphones) over a cellular network upon receiving a signal from the siren controller 106. The SMS server 210 can generate text for the emergency alert message based on the signal received from the siren controller 106. For example, the text based message can include a date, time, and location within the industrial facility of the emergency incident. This information can inform personnel of safe evacuation routes and the areas of the facility to be avoided. The SMS server 210 can include a registry of telephone numbers of cellular devices 212 to which the SMS server 210 broadcasts the emergency alert messages. The registry of telephone numbers can be based on a directory of personnel assigned to work in the industrial facility. The registry of telephone numbers can also include telephone numbers that have been registered with the industrial facility to receive emergency alerts.

A telephone system 214 is connected to the siren controller 106 through a third interface port 202c of the siren controller 106. The telephone system 214 can be an audio conferencing system. The telephone system 214 can generate automated telephone calls to telephones 216 associated with the industrial facility. The telephones 216 can include landline telephones (e.g., office telephones) and cellular telephones. The automated telephone calls can include a pre-recorded voice message. The telephone system 214 can also generate voice messages including specific detail of the emergency incident. The telephone system 214 can include a registry of telephone numbers stored in data store to which automated calls should be generated. The registry of telephone numbers can include all of the landline telephones, or a designated subset of the landline telephones, associated with the industrial facility. The registry of telephone numbers can include cellular telephone numbers registered with the facility and/or cellular telephone numbers based on a directory of personnel assigned to the facility.

A local network server 218 is connected to the siren controller 106 through a fourth interface port 202d of the siren controller 106. The local network server 218 communicates with local computing devices 220 (e.g., laptop computers, desktop computers, tablets) connected to the local IT network. The local network server 218 can communicate with the local computing devices 220 through wired and/or wireless networks. The local network server 218 is configured to generate and push pop-up messages to the local computing devices 220 when the local network server 218 receives a signal from the siren controller 106. For example, the local network server 218 generates an instruction to cause an application instance hosted on the local computing devices 220 to interrupt execution of one or more executing programs and render a graphical representation of an emergency message. For example, the application instance renders the pop-up message on top of the contents currently displayed on the local computing devices. In some examples, the application instance disables some functionality of the computing device at least until a user acknowledges the pop-up message to encourage users to evacuate the facility. In some implementations, the pop-up message is rendered as a notification on the user interface. In some implementations, the pop-up message includes an audible alert to be played by speakers of the local computing device. The local network server 218 transmits the generated instructions to the local computing devices 220 over the local network.

The siren controller 106 is configured to activate one or more of the systems 206, 210, 214, 218 connected via the interface ports 202 when the siren controller 106 detects activation of the facility siren 204. For example, the interface port 202c can be in a normally open status (e.g., open circuit) with DC power disconnected from the interface port 202c and the telephone system 214. Once the facility siren 204 is activated, the siren controller 106 can change the status of the interface port 202c to normally closed (e.g., closed circuit) which allows the DC power to be applied to the interface port 202c and the telephone system 214. The telephone system 214 generates calls to predefined phone numbers with a prerecorded voice message notifying personnel that the siren is activated and to evacuate the incident location.

In some implementations, interface ports 202 are configured as IP interfaces in a normally "off" status. When the facility siren 204 is activated, the siren controller 106 automatically changes the status of the interface 202 to an "on" status allowing communications via the interface ports 202.

The interactive control console 104 is communicatively coupled to the siren controller 106. The interactive control console 104 is coupled to a closed circuit camera system 226. The interactive control console 104 can generate and send commands to control cameras of the closed circuit camera system 226. The interactive control console 104 can receive live video streams from the closed circuit camera system 226. For example, the interactive control console 104 can generate control commands to direct cameras of the closed circuit camera system 226 to view the emergency incident.

In some implementations, the interactive control console 104 is configured to send and receive communications through the alert delivery system 102. In this manner, the interactive control console can centralize and coordinate communications with emergency responders and facility personnel. For example, the interactive control console 106 can generate a text-based message to route through the siren controller 106 and SMS server 210 to be delivered to specified cellular devices 212. Similarly, the interactive control console 104 can send and receive radio transmission via the radio base station 206. The interactive control console 104 can send and receive telephone calls via the telephone system 214.

In some implementations, the interactive control console 104 includes a user interface configured to activate a two-way communications channel over one or multiple communication networks. For example, the user interface can display an icon representing a type of communication, and when a user clicks on the icon, the interactive control console activates the selected communications network. For example, if the user selects an SMS icon, the user interface opens a pop-up window to input text to send and an address box to select telephone numbers to receive the message. In other examples, when a user selects a radio icon, a radio control panel opens including a push-to-talk icon to enable communication via the radio base station between the user of the interactive control console 104 and emergency responders. In some examples, a user selects a telephone icon that initiates a number pad pop-up to input a telephone number and initiate the telephone call. In some examples, a user can select a broadcast to multiple icon to have a message broadcast via voice, text, or both over multiple networks simultaneously.

The interactive control console 104 receives locations of emergency response vehicles from an automatic vehicle locator 224. The interactive control console 104 renders for display the real-time locations received from the automatic vehicle locator 224. The interactive control console 104 can be connected with a map server to access and render for display maps of the industrial facility. In some implementations, interactive control console 104 can send commands or other instructions to the response vehicles based on the locations of the response vehicles. For example, interactive control console 104 may initiate a navigation system on board one or more emergency response vehicles to assist those emergency response vehicles for coordinating their responses to the emergency at the industrial facility. For example, the interactive control console 104 may identify the closest emergency response vehicles and prioritize those vehicles for responding to the emergency. In another example, the interactive control console 104 may identify one or more emergency response vehicles based on a type of those one or more emergency response vehicles. If the one or more emergency response vehicles are the right type (e.g., fire suppression vs. an ambulance) that can be responsive to the identified emergency, those vehicles are contacted for responding to the emergency. If not, the interactive control console 104 may then proceed to identify other vehicles that are nearby that may be responsive to the particular emergency that is detected. In some implementations, the interactive control console renders for display an estimated time of arrival at the emergency incident of the one or more emergency response vehicles based on the received locations.

In some implementations, the interactive control console 104 can access the status of the industrial facility's information technology (IT) assets (e.g., local network connections, servers, routers, switches, etc.). The interactive control console 104 can generate or access instructions to restore IT assets that indicate a failure (e.g., lack of connection to the local network).

Figure 3:
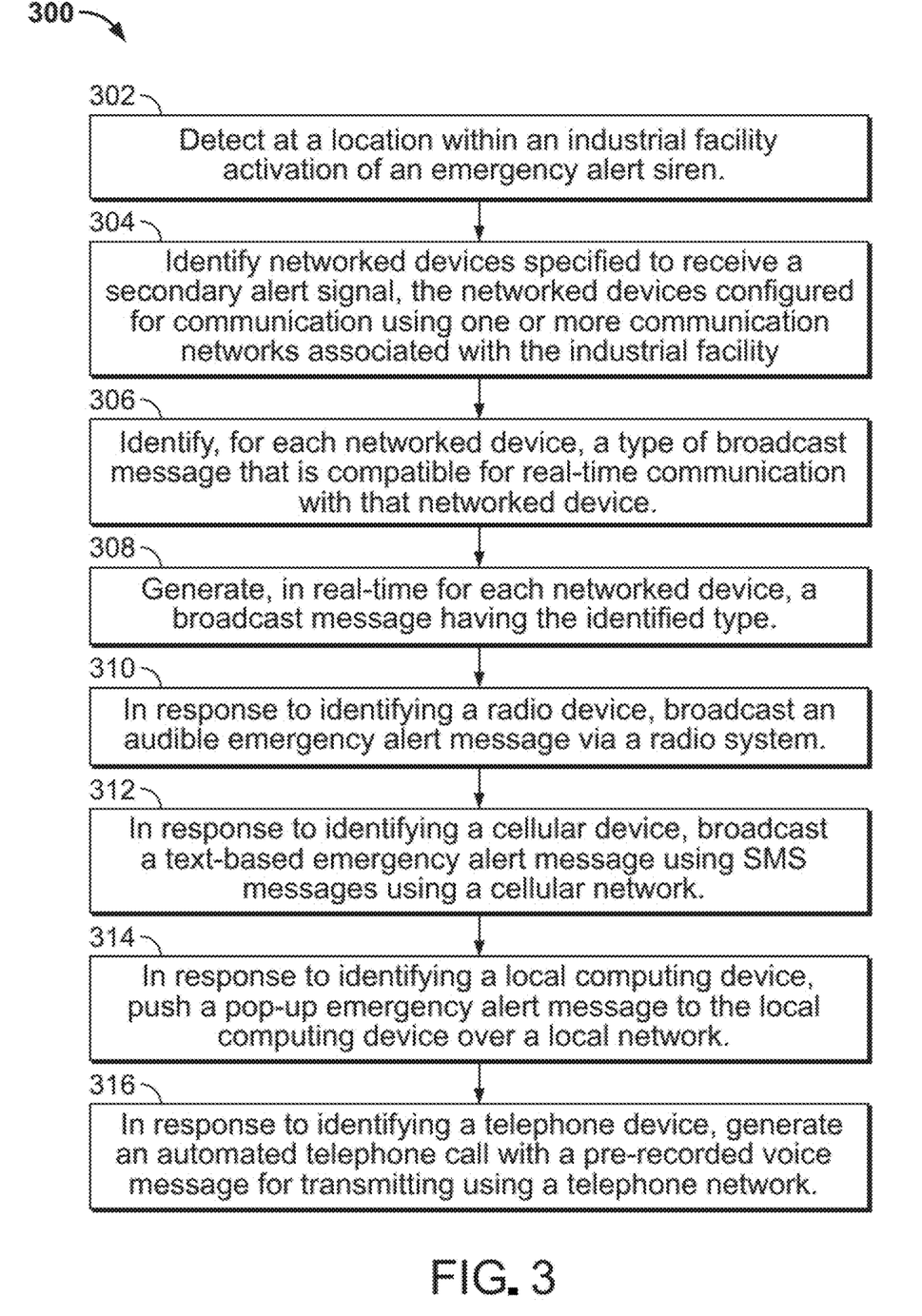
FIG. 3 is a flow chart of an example method for automatically broadcasting a real-time emergency signal to networked devices at an industrial facility.

FIG. 3 is a flow chart of an example method 300 for automatically broadcasting a real-time emergency signal to a plurality of networked devices at an industrial facility. The method 300 can be executed by, for example, the emergency response system 100.

A data processing system detects, at a location within the industrial facility, activation of an emergency alert siren (step 302). For example, the data processing system can detect the activation of the emergency alert siren by detecting that a sound level exceeds a threshold level associated with the emergency alert siren. In some implementations, the data processing system is communicatively coupled to the emergency alert siren and the data processing system detects activation of the emergency alert siren by receiving an electronic signal indicating that the emergency alert siren has been activated.

In response to detecting activation of the emergency alert siren, the data processing system identifies a plurality of networked devices specified to receive a secondary alert signal, the plurality of networked devices configured for communication using one or more communication networks associated with the industrial facility (step 304). The data processing system can identify networked devices based on networks connected to interface ports of the data processing system.

The data processing system identifies, for each networked device of the plurality, a type of broadcast message that is compatible for real-time communication with that networked device (step 306). For example, the data processing system can identify an audible emergency alert that is compatible with an audio networked device such as a radio or telephone. The data processing system can identify a text based alert that is compatible with networked devices including display devices (e.g., desktop computers, laptop computer, tablets, cellular telephones).

The data processing system generates, in real-time for each networked device of the plurality, a broadcast message having the identified type (step 308). The generated broadcast message can include, for example, pre-recorded voice messages, standardized text messages, and information about the emergency event such as date, time and location within the facility.

In response to identifying a radio device, the data processing system broadcasts, to the radio device, an audible emergency alert message via a radio system (step 310). The data processing system can broadcast the emergency alert message via a radio system such as a two-way radio system or an FM radio system. The emergency alert message can include a pre-recorded voice message and/or emergency alert tones.

In response to identifying a cellular device, the data processing system broadcasts a text-based emergency alert message, to the cellular device, using SMS messages using a cellular network (step 312). The data processing system can broadcast the emergency alert message to cellular devices based on a registry of telephone numbers stored in the data store of the data processing system. The registry of telephone numbers can be based on a directory of personnel assigned to the industrial facility and/or a directory of telephone numbers registered with the industrial facility to receive emergency alerts.

In response to identifying a local computing device, the data processing system pushes a pop-up emergency alert message to the local computing device over a local network (step 314). The data processing system can activate a server system to generate an instruction configured to cause an application instance hosted on the computing device to interrupt execution of one or more executing programs and render a graphical representation of an emergency message in the broadcast message. The data processing system can cause the server system to transmit the broadcast message including the instruction over the local network to the computing device. The pop-up emergency alert message can include a visual alert such as a text-based message and an audible alert such as a pre-recorded message or emergency alert tones to be played on speakers of the local computing device. The data processing system can push the pop-up messages to computing devices based on a current list of internet protocol (IP) addresses of devices connected to the local network.

In response to identifying a telephone device, the data processing system generates an automated telephone call with a pre-recorded voice message for transmitting using a telephone network (step 316). The data processing system can transmit the automated telephone call via a wired telephone network (e.g., a landline network) and/or a wireless telephone network (e.g., a cellular network). The data processing system can generate automated telephone calls based on a registry of telephone numbers stored in the data store of the data processing system. The registry of telephone numbers can include the registry of telephone numbers specified to receive SMS emergency alert messages. The registry of telephone numbers can include telephone numbers associated with the industrial facility, telephone numbers based on a directory of personnel assigned to the facility, and/or telephone numbers registered with the facility to receive automated telephone calls.

In some implementations, the data processing system receives one or more real-time locations of emergency response vehicles. The data processing system displays, on a display device, a map of the industrial facility showing the one or more real-time locations of emergency response vehicles.

In some implementations, in response to detecting an emergency alert siren, the data processing system controls closed circuit cameras to stream live video of the location of the detected emergency alert siren to be displayed on the display device. The data processing system can generate control commands to direct the closed circuit cameras to view the incident location.

Figure 4:
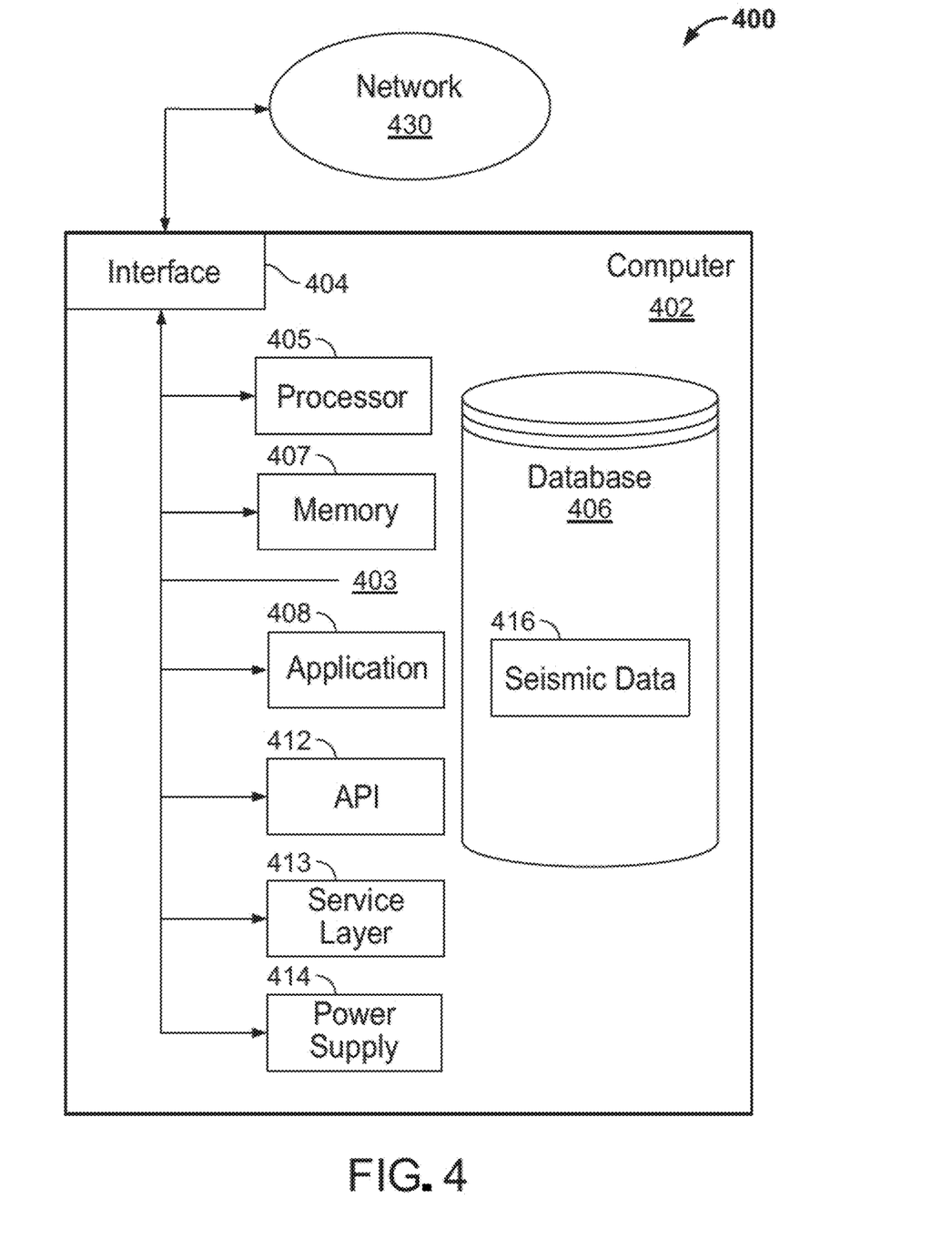
FIG. 4 is a block diagram illustrating an example computer system used to provide computational functionalities associated with described algorithms, methods, functions, processes, flows, and procedures according to some implementations of the present disclosure.

FIG. 4 is a block diagram of an example computer system 400 used to provide computational functionalities associated with described algorithms, methods, functions, processes, flows, and procedures described in the present disclosure, according to some implementations of the present disclosure. The illustrated computer 402 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 402 can include input devices such as keypads, keyboards, and touch screens that can accept user information. Also, the computer 402 can include output devices that can convey information associated with the operation of the computer 402. The information can include digital data, visual data, audio information, or a combination of information. The information can be presented in a graphical user interface (UI) (or GUI).

The computer 402 can serve in a role as a client, a network component, a server, a database, a persistency, or components of a computer system for performing the subject matter described in the present disclosure. The illustrated computer 402 is communicably coupled with a network 430. In some implementations, one or more components of the computer 402 can be configured to operate within different environments, including cloud-computing-based environments, local environments, global environments, and combinations of environments.

At a high level, the computer 402 is an electronic computing device operable to receive, transmit, process, store, and manage data and information associated with the described subject matter. According to some implementations, the computer 402 can also include, or be communicably coupled with, an application server, an email server, a web server, a caching server, a streaming data server, or a combination of servers.

The computer 402 can receive requests over network 430 from a client application (for example, executing on another computer 402). The computer 402 can respond to the received requests by processing the received requests using software applications. Requests can also be sent to the computer 402 from internal users (for example, from a command console), external (or third) parties, automated applications, entities, individuals, systems, and computers.

Each of the components of the computer 402 can communicate using a system bus 403. In some implementations, any or all of the components of the computer 402, including hardware or software components, can interface with each other or the interface 404 (or a combination of both), over the system bus 403. Interfaces can use an application programming interface (API) 412, a service layer 413, or a combination of the API 412 and service layer 413. The API 412 can include specifications for routines, data structures, and object classes. The API 412 can be either computer-language independent or dependent. The API 412 can refer to a complete interface, a single function, or a set of APIs.

The service layer 413 can provide software services to the computer 402 and other components (whether illustrated or not) that are communicably coupled to the computer 402. The functionality of the computer 402 can be accessible for all service consumers using this service layer. Software services, such as those provided by the service layer 413, can provide reusable, defined functionalities through a defined interface. For example, the interface can be software written in JAVA, C++, or a language providing data in extensible markup language (XML) format. While illustrated as an integrated component of the computer 402, in alternative implementations, the API 412 or the service layer 413 can be stand-alone components in relation to other components of the computer 402 and other components communicably coupled to the computer 402. Moreover, any or all parts of the API 412 or the service layer 413 can be implemented as child or sub-modules of another software module, enterprise application, or hardware module without departing from the scope of the present disclosure.

The computer 402 includes an interface 404. Although illustrated as a single interface 404 in FIG. 4, two or more interfaces 404 can be used according to particular needs, desires, or particular implementations of the computer 402 and the described functionality. The interface 404 can be used by the computer 402 for communicating with other systems that are connected to the network 430 (whether illustrated or not) in a distributed environment. Generally, the interface 404 can include, or be implemented using, logic encoded in software or hardware (or a combination of software and hardware) operable to communicate with the network 430. More specifically, the interface 404 can include software supporting one or more communication protocols associated with communications. As such, the network 430 or the interface's hardware can be operable to communicate physical signals within and outside of the illustrated computer 402.

The computer 402 includes a processor 405. Although illustrated as a single processor 405 in FIG. 4, two or more processors 405 can be used according to particular needs, desires, or particular implementations of the computer 402 and the described functionality. Generally, the processor 405 can execute instructions and can manipulate data to perform the operations of the computer 402, including operations using algorithms, methods, functions, processes, flows, and procedures as described in the present disclosure.

The computer 402 also includes a database 406 that can hold data for the computer 402 and other components connected to the network 430 (whether illustrated or not). For example, database 406 can be an in-memory, conventional, or a database storing data consistent with the present disclosure. In some implementations, database 406 can be a combination of two or more different database types (for example, hybrid in-memory and conventional databases) according to particular needs, desires, or particular implementations of the computer 402 and the described functionality. Although illustrated as a single database 406 in FIG. 4, two or more databases (of the same, different, or combination of types) can be used according to particular needs, desires, or particular implementations of the computer 402 and the described functionality. While database 406 is illustrated as an internal component of the computer 402, in alternative implementations, database 406 can be external to the computer 402.

The computer 402 also includes a memory 407 that can hold data for the computer 402 or a combination of components connected to the network 430 (whether illustrated or not). Memory 407 can store any data consistent with the present disclosure. In some implementations, memory 407 can be a combination of two or more different types of memory (for example, a combination of semiconductor and magnetic storage) according to particular needs, desires, or particular implementations of the computer 402 and the described functionality. Although illustrated as a single memory 407 in FIG. 4, two or more memories 407 (of the same, different, or combination of types) can be used according to particular needs, desires, or particular implementations of the computer 402 and the described functionality. While memory 407 is illustrated as an internal component of the computer 402, in alternative implementations, memory 407 can be external to the computer 402.

The application 408 can be an algorithmic software engine providing functionality according to particular needs, desires, or particular implementations of the computer 402 and the described functionality. For example, application 408 can serve as one or more components, modules, or applications. Further, although illustrated as a single application 408, the application 408 can be implemented as multiple applications 408 on the computer 402. In addition, although illustrated as internal to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion and management circuits, including recharging, standby, and power management functionalities. In some implementations, the power-supply 414 can include a power plug to allow the computer 402 to be plugged into a wall socket or a power source to, for example, power the computer 402 or recharge a rechargeable battery.

There can be any number of computers 402 associated with, or external to, a computer system containing computer 402, with each computer 402 communicating over network 430. Further, the terms "client," "user," and other appropriate terminology can be used interchangeably, as appropriate, without departing from the scope of the present disclosure. Moreover, the present disclosure contemplates that many users can use one computer 402 and one user can use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tape, cartridges, cassettes, and internal/removable disks.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

A number of embodiments of these systems and methods have been described. Nevertheless, it will be understood that various modifications may be made without departing from the spirit and scope of this disclosure. Accordingly, other embodiments are within the scope of the following claims.

What is claimed is:

1. A method for automatically broadcasting a real-time emergency signal to a plurality of networked devices at an industrial facility, the method comprising:
   detecting, at a location within the industrial facility, activation of an emergency alert siren;
   in response to detecting activation of the emergency alert siren, identifying a plurality of networked devices specified to receive a secondary alert signal, the plurality of networked devices configured for communication using one or more communication networks associated with the industrial facility;
   identifying, for each networked device of the plurality, a type of broadcast message that is compatible for real-time communication with that networked device;
   generating, in real-time for each networked device of the plurality, a broadcast message having the identified type, wherein generating the broadcast message comprises:
      in response to identifying a radio device, broadcasting, to the radio device, an audible emergency alert message via a radio system;
      in response to identifying a cellular device, broadcasting a text-based emergency alert message, to the cellular device, using short message service (SMS) messages using a cellular network;

in response to identifying a local computing device, pushing a pop-up emergency alert message to the local computing device over a local network; and in response to identifying a telephone device, generating an automated telephone call with a pre-recorded voice message for transmitting using a telephone network.

2. The method of claim 1, wherein pushing the pop-up emergency alert message comprises:

activating a server system to generate an instruction configured to cause an application instance hosted on the computing device to interrupt execution of one or more executing programs and render a graphical representation of an emergency message in the broadcast message; and causing the server system to transmit the broadcast message including the instruction over the local network to the computing device.

3. The method of claim 2, wherein the pop-up emergency alert message comprises a visual alert and an audible alert.

4. The method of claim 1, wherein identifying a telephone device comprises accessing, from a data store, a registry of telephone numbers associated with the industrial facility.

5. The method of claim 1, wherein broadcasting, to the radio device, an audible emergency alert message via a radio system comprises broadcasting a pre-recorded voice message via a two-way radio system.

6. The method of claim 1, wherein broadcasting a text-based emergency alert message, to the cellular device, using SMS messages using a cellular network comprises a date, a time, and the location of the detected emergency alert siren.

7. The method of claim 1 further comprising:

receiving one or more real-time locations of emergency response vehicles; and displaying, on a display device, a map of the facility showing the one or more real-time locations of emergency response vehicles.

8. The method of claim 7 further comprising:

in response to detecting an emergency alert siren, controlling closed circuit cameras to view the location of the activated emergency alert siren; and displaying, on the display device, live video from the closed circuit cameras.

9. A system for alerting personnel at an industrial facility in an emergency situation, the system comprising:

a facility siren controller comprising a plurality of interface ports;

a radio base station communicatively coupled to the siren controller via a first port of the plurality of interface ports;

a short message service (SMS) server coupled to the siren controller via a second port of the plurality of interface ports;

a telephone system communicatively coupled to the siren controller via a third port of the plurality of interface ports;

a local network server coupled to the siren controller via a fourth port of the plurality of interface ports;

the facility siren controller comprising at least one processor and a memory storing instructions that, when executed by the at least one processor, cause the at least one processor to perform operations comprising:

detecting, at a location within the industrial facility, activation of an emergency alert siren;

in response to detecting activation of the emergency alert siren, identifying a plurality of networked devices specified to receive a secondary alert signal, the plurality of networked devices configured for communication using one or more communication networks associated with the industrial facility;

identifying, for each networked device of the plurality, a type of broadcast message that is compatible for real-time communication with that networked device;

generating, in real-time for each networked device of the plurality, a broadcast message having the identified type, wherein generating the broadcast message comprises:

in response to identifying a radio device, broadcasting, to the radio device, an audible emergency alert message via a radio system;

in response to identifying a cellular device, broadcasting a text-based emergency alert message, to the cellular device, using short message service (SMS) messages using a cellular network;

in response to identifying a local computing device, pushing a pop-up emergency alert message to the local computing device over a local network; and in response to identifying a telephone device, generating an automated telephone call with a pre-recorded voice message for transmitting using a telephone network.

10. The system of claim 9, wherein pushing the pop-up emergency alert message comprises:

activating a server system to generate an instruction configured to cause an application instance hosted on the computing device to interrupt execution of one or more executing programs and render a graphical representation of an emergency message in the broadcast message; and causing the server system to transmit the broadcast message including the instruction over the local network to the computing device.

11. The system of claim 10, wherein the pop-up emergency alert message comprises a visual alert and an audible alert.

12. The system of claim 9, wherein identifying a telephone device comprises accessing, from a data store, a registry of telephone numbers associated with the industrial facility.

13. The system of claim 9, wherein broadcasting, to the radio device, an audible emergency alert message via a radio system comprises broadcasting a pre-recorded voice message via a two-way radio system.

14. The system of claim 9, wherein broadcasting a text-based emergency alert message, to the cellular device, using SMS messages using a cellular network comprises a date, a time, and the location of the detected emergency alert siren.

15. The system of claim 9, further comprising:

an interactive control console communicatively coupled to the siren controller, the interactive control console comprising a display device, at least one processor, and a memory storing instructions that, when executed by the at least one processor, cause the at least one processor to perform a second set of operations comprising:

receiving one or more real-time locations of emergency response vehicles; and displaying, on a display device, a map of the facility showing the one or more real-time locations of emergency response vehicles.

16. The system of claim 15, wherein the second set of operations further comprise:
- in response to detecting an emergency alert siren, controlling closed circuit cameras to view the location of the activated emergency alert siren; and
- displaying, on the display device, live video from the closed circuit cameras.

17. One or more non-transitory machine-readable storage devices storing instructions for automatically broadcasting a real-time emergency signal to a plurality of networked devices at an industrial facility, the instructions being executable by one or more processors, to cause performance of operations comprising:
- detecting, at a location within the industrial facility, activation of an emergency alert siren;
- in response to detecting activation of the emergency alert siren, identifying a plurality of networked devices specified to receive a secondary alert signal, the plurality of networked devices configured for communication using one or more communication networks associated with the industrial facility;
- identifying, for each networked device of the plurality, a type of broadcast message that is compatible for real-time communication with that networked device;
- generating, in real-time for each networked device of the plurality, a broadcast message having the identified type, wherein generating the broadcast message comprises:
  - in response to identifying a radio device, broadcasting, to the radio device, an audible emergency alert message via a radio system;
  - in response to identifying a cellular device, broadcasting a text-based emergency alert message, to the cellular device, using short message service (SMS) messages using a cellular network;
  - in response to identifying a local computing device, pushing a pop-up emergency alert message to the local computing device over a local network; and
  - in response to identifying a telephone device, generating an automated telephone call with a pre-recorded voice message for transmitting using a telephone network.

18. The non-transitory machine-readable storage devices of claim 17, wherein pushing the pop-up emergency alert message comprises:
- activating a server system to generate an instruction configured to cause an application instance hosted on the computing device to interrupt execution of one or more executing programs and render a graphical representation of an emergency message in the broadcast message; and
- causing the server system to transmit the broadcast message including the instruction over the local network to the computing device.

19. The non-transitory machine-readable storage devices of claim 17, wherein the operations further comprise:
- receiving one or more real-time locations of emergency response vehicles; and
- displaying, on a display device, a map of the facility showing the one or more real-time locations of emergency response vehicles.

20. The non-transitory machine-readable storage devices of claim 19, wherein the operations further comprise:
- in response to detecting an emergency alert siren, controlling closed circuit cameras to view the location of the activated emergency alert siren; and
- displaying, on the display device, live video from the closed circuit cameras.

* * * * *